United States Patent [19]

Chalasani et al.

[11] Patent Number: 5,274,782
[45] Date of Patent: Dec. 28, 1993

[54] METHOD AND APPARATUS FOR DYNAMIC DETECTION AND ROUTING OF NON-UNIFORM TRAFFIC IN PARALLEL BUFFERED MULTISTAGE INTERCONNECTION NETWORKS

[75] Inventors: Suresh Chalasani, Los Angeles, Calif.; Anujan M. Varma, Croton-on-Hudson, N.Y.

[73] Assignee: International Business Machines Corporation, Armonk, N.Y.

[21] Appl. No.: 573,610

[22] Filed: Aug. 27, 1990

[51] Int. Cl.$^5$ .............................................. G06F 13/00
[52] U.S. Cl. .................................. 395/325; 395/425; 364/DIG. 1; 364/228; 364/228.3; 364/243; 364/242.94
[58] Field of Search ... 364/200 MS File, 900 MS File; 395/425, 200, 800, 325; 370/60, 94.1

[56] References Cited

U.S. PATENT DOCUMENTS

| | | | |
|---|---|---|---|
| 4,484,262 | 11/1984 | Sullivan et al. | 395/425 |
| 4,512,011 | 4/1985 | Turner | 370/60 |
| 4,621,359 | 11/1986 | McMillen | 370/60 |
| 4,752,777 | 6/1988 | Franaszek | 340/825.79 |
| 4,920,484 | 4/1990 | Ranade | 395/200 |
| 4,965,718 | 10/1990 | George et al. | 395/575 |
| 4,969,088 | 11/1990 | McAuliffe et al. | 364/200 |
| 4,989,131 | 1/1991 | Stone | 364/200 |
| 5,021,947 | 6/1991 | Campbell et al. | 364/200 |
| 5,111,389 | 5/1992 | McAuliffe et al. | 395/800 |

*Primary Examiner*—Rebecca L. Rudolph
*Attorney, Agent, or Firm*—Whitham & Marhoefer

[57] ABSTRACT

A method and apparatus for routing processor-memory data traffic in a shared-memory multiprocessor computer system employs an interconnection network including two buffered multistage switching networks. Each of these networks can be used to route the data from any processing element to any memory element. Depending on the nature of the processor-memory traffic, two distinct routing schemes are used to distribute the traffic among the two networks. The first method distributes the memory accesses evenly among the two networks and maximizes performance when the memory accesses are uniformly distributed among the memory modules. However, when the traffic is highly non-uniform, a second routing method is used to confine the non-uniform part of the traffic to one network and the remaining part to the other network. The routing method is selected based on the prevailing traffic conditions. A distributed feedback mechanism detects the change in traffic conditions and changes the routing method accordingly. A traffic monitoring circuit within each memory module monitors the traffic into the memory module continuously and senses a change in the traffic condition. The condition is conveyed to the processing elements by means of a status flag associated with each response message from the memory module to processing elements. The processing elements respond to a change in traffic condition by switching to the alternate routing method.

12 Claims, 6 Drawing Sheets

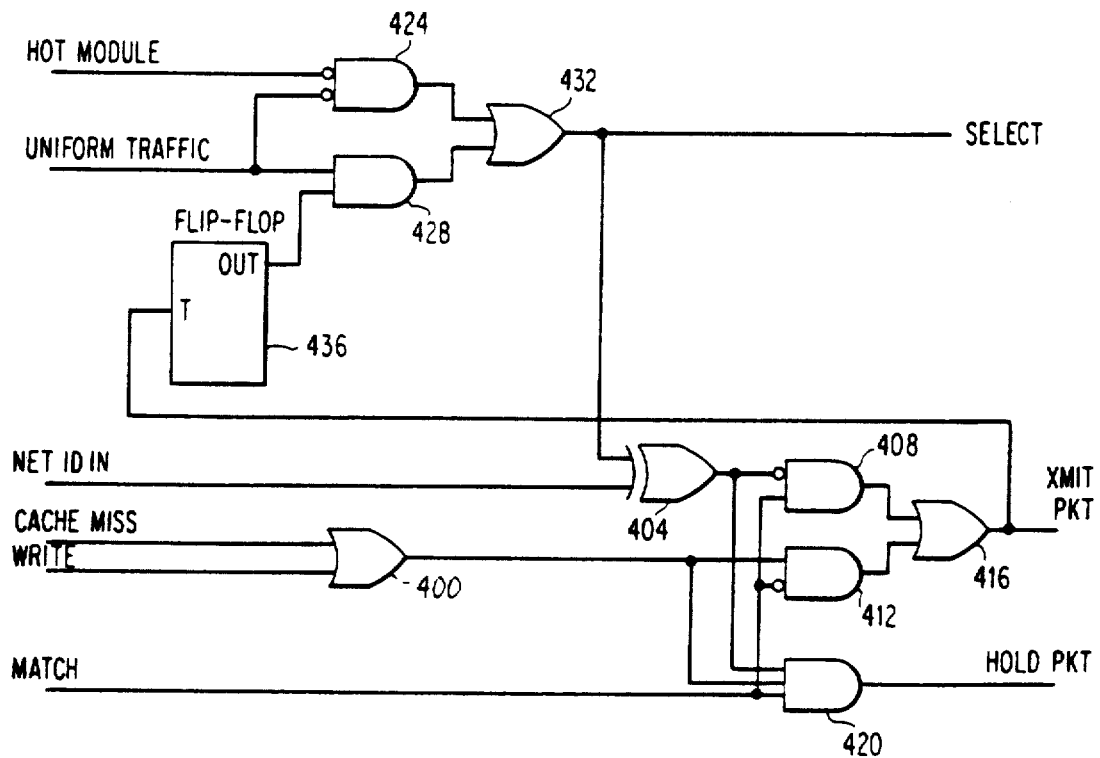

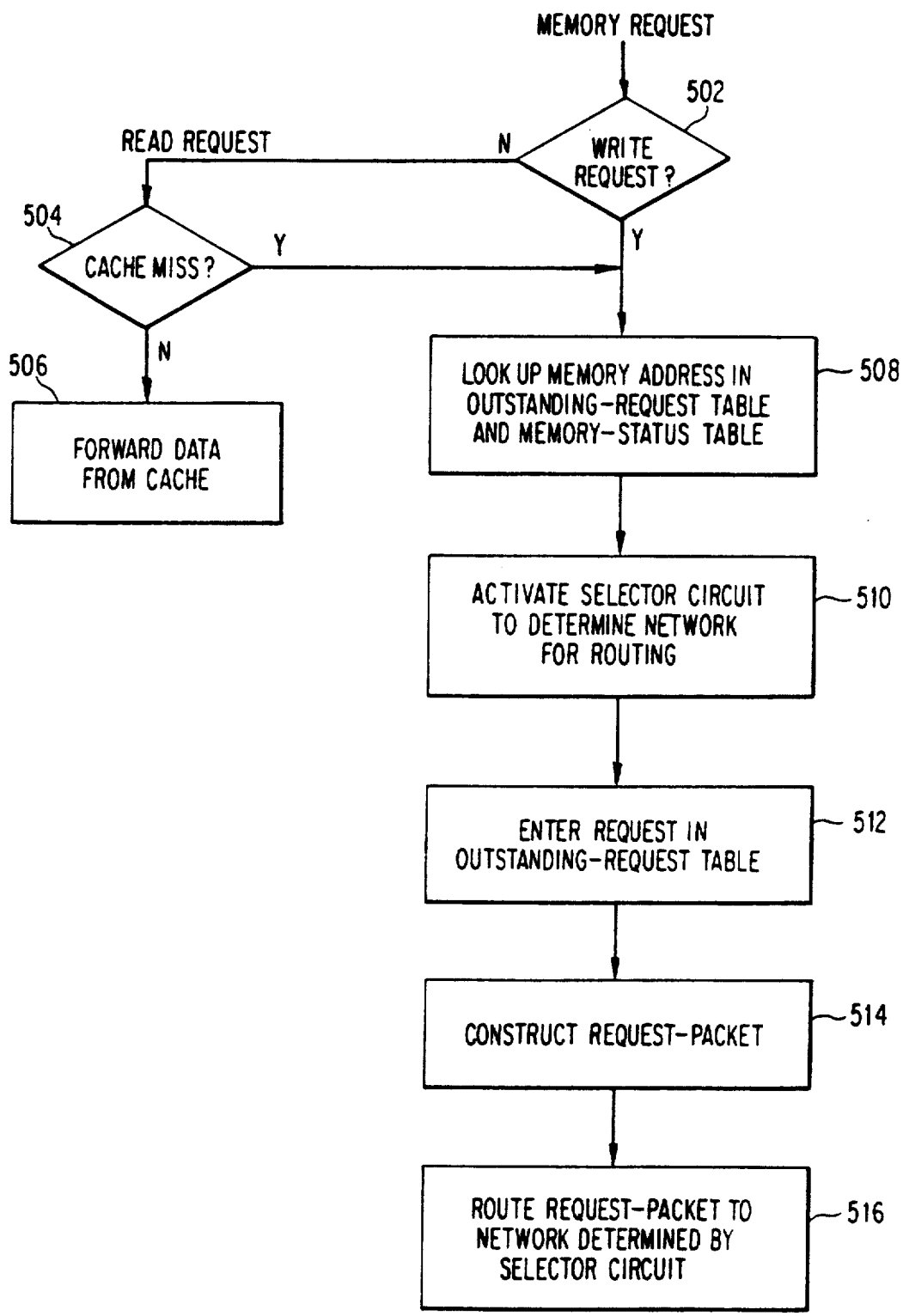

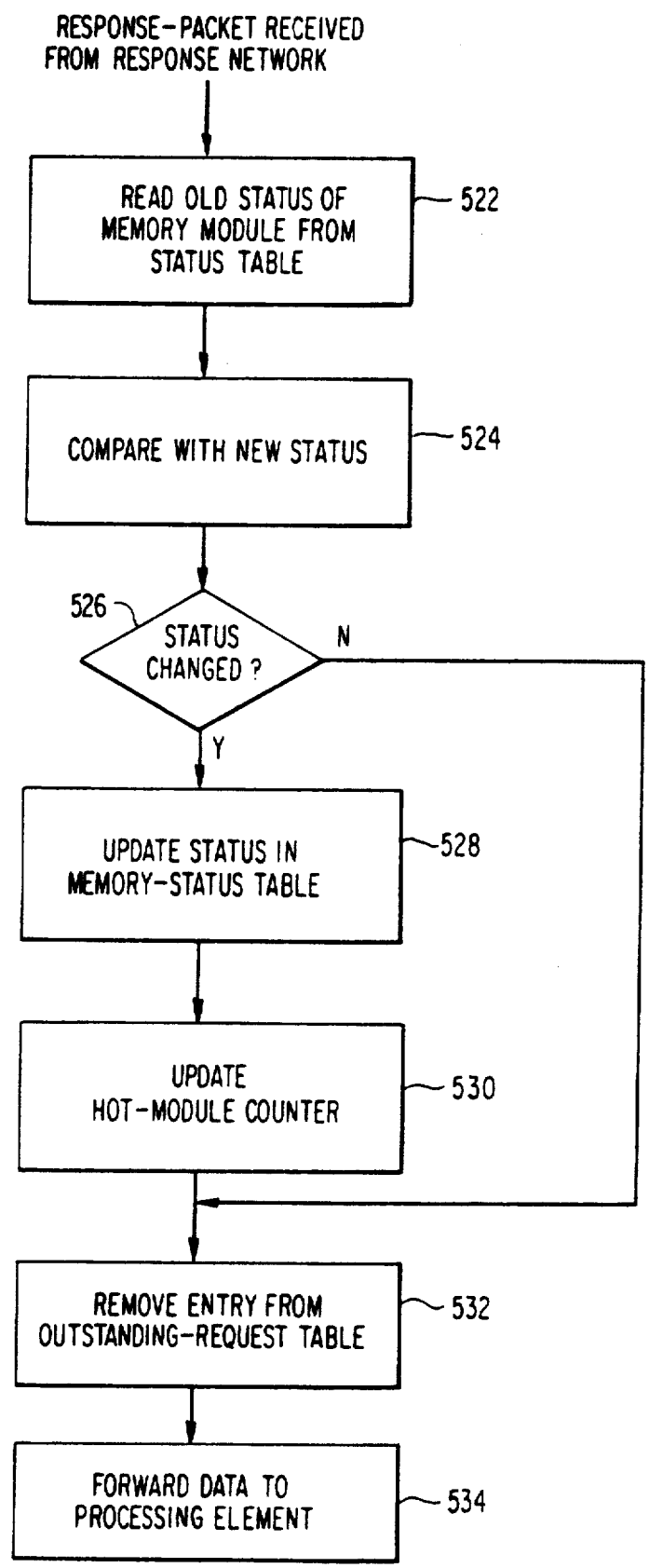

METHOD AND APPARATUS FOR DYNAMIC DETECTION AND ROUTING OF NON-UNIFORM TRAFFIC IN PARALLEL BUFFERED MULTISTAGE INTERCONNECTION NETWORKS

BACKGROUND OF THE INVENTION

1. Field of the Invention

The present invention generally relates to multiprocessor computer systems in which a plurality of processors and a plurality of memory modules are interconnected by means of an interconnection network consisting of two multistage switching networks. More specifically, the invention relates to the routing of data traffic from the processors to the memory modules through the interconnection network.

2. Description of the Prior Art

Buffered multistage interconnections are used for processor-to-memory and processor-to-processor communications in shared-memory multiprocessor systems. These networks typically consist of $\log_k N$ stages of switching elements, each switching element having $k$ input and output terminals. Messages sent through the network are usually in the form of fixed-size packets which represent a memory word or cache line. Buffers are provided in the individual switching chips for queuing the incoming packets in the event of contention.

The traffic carried by the interconnection network in a shared-memory multiprocessor consists of requests from processing elements to memory modules for storage or retrieval of data. The nature of this traffic can vary from time to time depending on the algorithm being executed by the processing elements and the way the accessed data are distributed among the memory modules. When the traffic pattern is such that all memory modules are accessed with approximately equal frequency, such traffic is referred to as uniform traffic. If a subset of memory modules receive a larger share of traffic than the remaining ones, such traffic is referred to as non-uniform traffic.

Buffered multistage networks perform well under uniform traffic but degrade severely with even slight non-uniformities in the network traffic. When the traffic is highly non-uniform, multistage networks suffer from a phenomenon known as tree-saturation. This phenomenon is studied in an article entitled "Hot-Spot Contention and Combining in Multistage Interconnection Neworks" by G. F. Pfister and V. A. Norton, *IEEE Transactions on Computers*, October 1985, pp. 943-948. The tree-saturation causes severe congestion in the network, increasing delay through the network substantially for all traffic to memory modules.

Several solutions have been proposed to alleviate the tree-saturation effect produced by non-uniform traffic on a multistage interconnection network. Pfister and Norton suggested combining of messages to reduce the request rate experienced by the hot memory module. Two messages can be combined in a switching element only if they are addressed to the same memory location in the hot memory module and they arrive at the switch almost at the same time.

Another method, described in an article entitled "The NYU Ultracomputer—Designing a MIMD Shared Memory Parallel Computer", by A. Gottleib et al., *IEEE Transactions on Computers*, February 1983, pp. 175-189, uses a special network, called a combining network. The combining network attempts to reduce congestion by combining access requests to a memory module enroute to the memory, thereby reducing the effective traffic into the memory module. The individual switching elements in a combining network are designed in such a way that two requests to a memory module arriving at a switching element simultaneously are combined into one outgoing request.

Although they reduce congestion from a hot spot, combining networks are complex to design and introduce additional delay owing to the combining function. Besides, the approach is useful for only one particular type of non-uniform traffic where the large fraction of traffic is directed to a single memory-location in a memory module. Combining is ineffective if the traffic to a memory module are not directed to a single location.

An alternate approach to reduce congestion is described in an article entitled "Distributing Hot-Spot Addressing in Large-Scale Multiprocessors", by P. -C. Yew, N. -F. Tzeng and D. H. Lawrie, *IEEE Transactions on Computers*, April 1987, pp. 388-395. This method is a software technique where the computational algorithm being run on the multiprocessor is structured so as to distribute the memory accesses among several memory modules. This method is useful only in the case of certain computations and in cases where the behavior of the program being executed on the multiprocessor can be predicted beforehand. This is difficult to achieve in a vast number of programs, where the memory-access behavior is unpredictable and difficult to control.

When two identical multistage switching network are used for processor-memory interconnection, every request from a processing element to a memory module can be routed along either network. Therefore, some method is needed to determine the path to be used for each request. A simple strategy is to divide the traffic equally among the two networks, perhaps best achieved by routing packets addressed to odd memory addresses to one network and the remaining packets to the second network. This strategy is referred to herein as the balanced strategy. The balanced strategy performs well with uniform traffic. However, a single hot spot causes tree-saturation in one of the network, affecting all traffic through that network. Multiple hot spots can saturate both networks. Under such situations, it is best to distribute the non-uniformities to one of the networks so that the second network provides a clear path for the rest of the traffic. If the network carrying the hot spot traffic happens to be a combining network, this improves performance of hot traffic as well. When no hot spots are present, however, the second strategy leaves one of the networks under-utilized. Therefore, what is needed is a scheme to detect hot spots when they develop and to change the routing strategy to improve performance.

If the location of the hot spots are known prior to run-time of a program, such dynamic detection of hot spots can be avoided. It may be possible to gather this information at compile time in the case of some scientific programs, but it is difficult in general. The presence of a local cache in each processor introduces an additional degree of complexity.

In practice, the traffic non-uniformities caused by memory-access patterns of programs change spatially and temporally during execution. That is, such non-uniformities appear and disappear over time, and their locations change. To exploit the flexibility afforded by the two switching networks fully, the routing method should be changed dynamically during program-execution, depending on the nature of the traffic.

Also known in the prior art the following U.S. patents which are related to interconnection networks for multiprocessor systems.

U.S. Pat. No. 4,512,011 to J. S. Turner discloses a packet-switching network comprising duplicated switch arrays to interconnect a number of high-speed digital trunk lines. A trunk controller associated with each trunk line routes packets to the switching network, selecting one of the arrays. If both arrays are available, the controller divides outgoing packets evenly among the arrays by alternating between them. If one of the arrays is unavailable, either because of a fault or because of traffic congestion, the controller routes traffic to the alternate one. A central processor monitors the condition of the switch-arrays and provides feedback to the trunk controllers.

While the present invention achieves similar function in a multiprocessor interconnection network, it does not use a central processor as in U.S. Pat. No. 4,512,011 and instead relies on a distributed feedback mechanism. Further, the present invention does not employ apparatus for monitoring traffic within the network and communicating this information to a central processor. Such functions, as well as the processing required by the central processor, would be prohibitively expensive in large multiprocessor systems. Therefore, the present invention places the monitoring function within the memory modules, and allows a simple design for the interconnection network.

U.S. Pat. No. 4,752,777 to P. A. Franaszek describes a dual-network interconnection system for processor-memory interconnection in a multiprocessor system. One of the networks is a multistage switching network while the other is a crosspoint switch. Traffic from any processing element to any memory module may be routed through either network, as in the present invention. However, no methods are disclosed or suggested for monitoring the system traffic and performing the routing based on the traffic conditions.

U.S. Pat. No. 4,621,359 to R. J. McMillen discloses a load balancing circuit for use within a switching node. This circuit distributes the incoming packets in the switching system evenly among the output ports. This method is applicable only if the system allows any packet to be routed to any output port without regard to its location. Such an assumption cannot be imposed in a multiprocessor system, where an access request issued by a processing element identifies a particular memory module and cannot be routed elsewhere.

SUMMARY OF THE INVENTION

It is therefore an object of the present invention to provide a multistage processor-memory interconnection network which alleviates congestion by confining the non-uniform part of the traffic to one switching network and the remaining part of the traffic to a second switching network.

It is another object of the invention to provide means for detection of traffic non-uniformities and dynamically changing the routing method so that performance is maximized under all conditions.

According to the invention, a scheme is provided for (1) the detection of hot spots in processor-memory interconnection networks before they cause tree-saturation and (2) the dynamic selection of two routing strategies based on this information. The environment in which the invention is applicable comprises two parallel switching networks to connect N processors to N memory units. The two networks are buffered multistage switching networks, and the second of the two networks can be a combining network. In any case, the networks perform identically when there is no combinable traffic.

The detection scheme is based on the observation that a "hot" memory module experiences a higher request rate over a certain period of time as compared to a memory module subjected to uniform traffic. The memory module is marked as "hot" if it has received at least H requests during the last W cycles (H-W). This status is reset to "cool" when the number of requests serviced in the last W cycles drops below another threshold, NH. This is achieved by keeping track of the number of requests received during a sliding window covering the last W cycles.

A status bit associated with the response packet from the memory module conveys the current status of the memory module. Thus, every processor accessing a memory module is informed of the status of the memory module when it receives the response packet. This information is used to select the routing strategy.

The two routing strategies, balanced and fixed, perform well for different ranges of hot spot intensities. The effectiveness of the scheme depends on responding to the right hot spot intensity and switching the strategies before any appreciable degradation in performance occurs. The effectiveness also depends to a great degree on the choice of the window length, W, and the thresholds, H and NH. Certain tradeoffs exist in the choice of the window length, W. A small W results in false indications of hot spots and oscillations. A large W will provide a more reliable indication of the hot spots, but there is the risk that tree-saturation might already have occurred before the hot spot is detected. The values for W, H and NH are determined empirically.

The routing strategy is decided independently at each processor based on the information it has received from the memory modules as part of the response packets. A processor uses the balanced strategy if it is not aware of any hot memory modules in the system and the fixed strategy otherwise.

BRIEF DESCRIPTION OF THE DRAWINGS

The foregoing and other objects, aspects and advantages will be better understood from the following detailed description of a preferred embodiment of the invention with reference to the drawings, in which:

FIG. 6 shows the format of the outstanding-request table of FIG. 5;

FIG. 7 is the internal logic diagram of the selector circuit of FIG. 5, and

FIGS. 8 and 9 are flow charts illustrating the logic of the control functions implemented in the routing control shown in FIG. 5.

DETAILED DESCRIPTION OF A PREFERRED EMBODIMENT OF THE INVENTION

Figure 1:
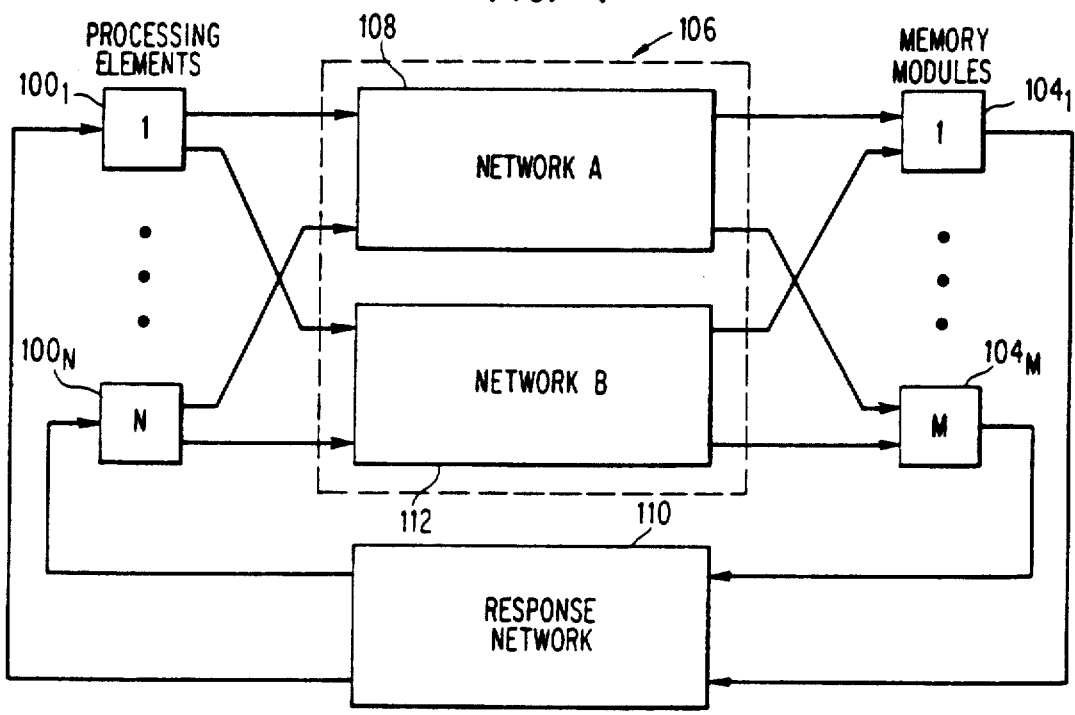
FIG. 1 block diagram showing the organization of a prior-art multiprocessor computer system where the present invention is used. It further shows two network-copies, indicated as Network A and Network B, for processor-to-memory communication.

Referring now to the drawings, and more particularly to FIG. 1, there is shown a plurality of N processing elements $100_1$ to $100_N$ connected to a plurality of M memory modules 104 through an interconnection system 106. The interconnection system consists of two identical multistage switching networks 108 and 112, referred to as network A and network B, respectively. These two networks form the request network where the traffic from the processing elements 100 to the memory modules 104 are routed. A separate response network 110 provides the return-path for the response-data from the memory modules 104 back to the processing elements 100. The response network 110 may consist of one or more multistage networks or a crosspoint network. No special requirements on its structure are imposed by the invention, as long as it is of sufficient capacity to transport the responses from the memory modules to the processing elements.

Figure 2:
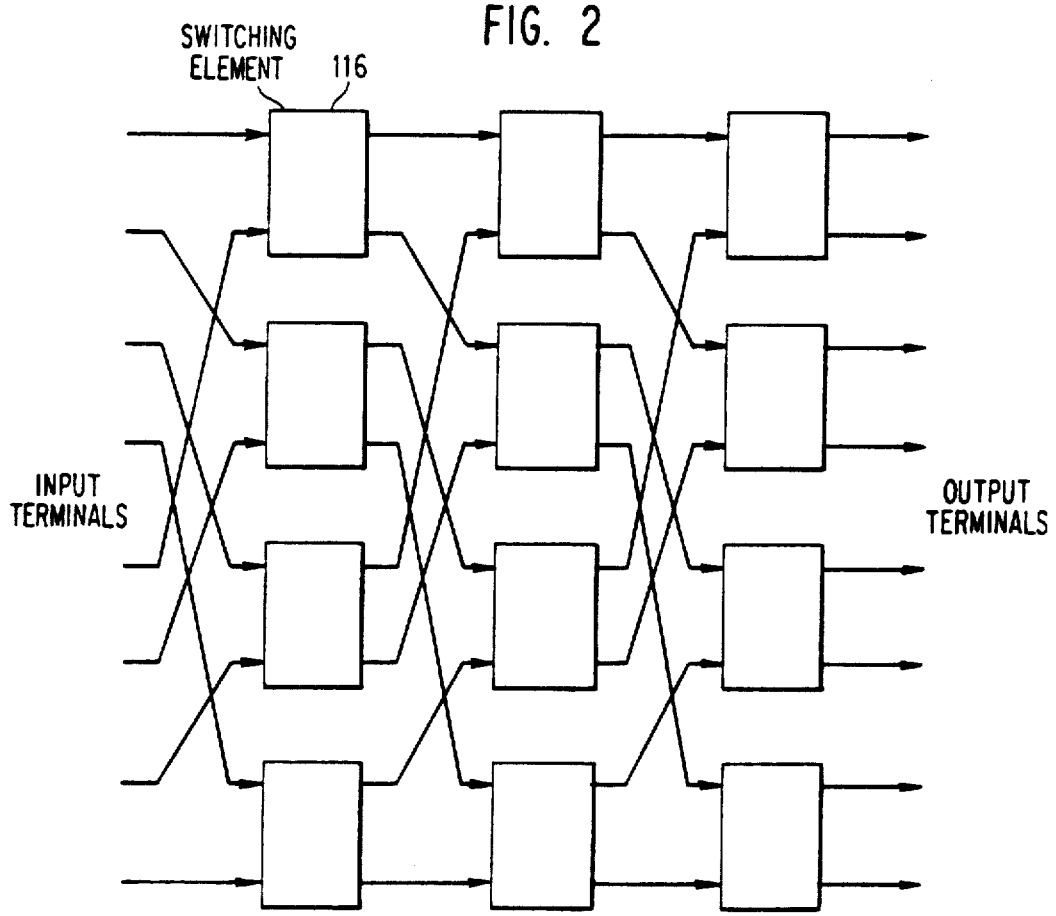
FIG. 2 is a block diagram of the internal structure of one of the network copies in FIG. 1, and is taken from prior art.

Each switching network 108 and 112 of FIG. 1 has the capability of routing data from any of its input terminals to any output terminal. Each network is constructed from multiple stages of switching elements, as illustrated in FIG. 2 for eight inputs and eight outputs. Each switching element 116 in FIG. 2 has two input lines and two output lines and there are three stages of such switching elements, comprising a total of twelve such switching elements in the illustrated example. The network can also be designed with switching elements having more than two inputs and two outputs, and the number of stages will be correspondingly smaller. The art of constructing such multistage switching networks is described in the article entitled "A Survey of Interconnection Networks" by T-Y. Feng, *Computer*, December 1981, pp. 12-27.

The data transmitted through the networks are in the form of packets. The destination of each packet, that is the memory module where the data is destined, is specified in the header portion of the packet. Each switching element in FIG. 2 receives such packets from its input terminals and switches them to the proper output terminal as determined by the destination-address specified in the header of the packet. An arriving packet is queued in the switching element if the requested output terminal is occupied by another packet. Packets are selected from the queue for transmission on a first-come-first-served basis.

Figure 3:
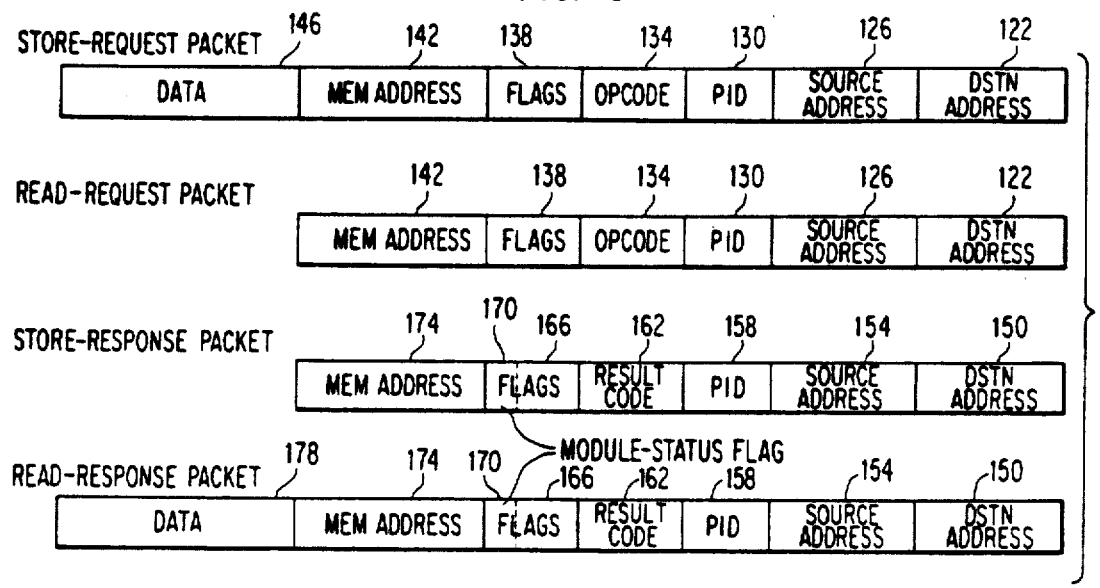
FIG. 3 illustrates the composition of the message packets transmitted over the interconnection network for each type of packet, showing the individual fields.

The multiprocessor system to which the present invention applies is of the shared-memory type where the processing elements communicate by way of storing and reading data in the memory modules. The traffic from processing elements to memory modules consists primarily of two types of packets, store-request packets and read-request packets. The composition of these packets is illustrated in FIG. 3. Each type of packet has a header part consisting of fields 122, 126 and 130 followed by information fields. In the header part, destination address field 122 specifies the address of the memory module where the packet is destined. The destination address is used by the individual switching elements 116 within the interconnection system to route the packet to the correct memory module. The header part further includes a source address field 126 which specifies the address of the processing element which generated the request so that the response from the memory module can be routed to that processing element over the response network. The packet identification (PID) field 130 in the header is used to identify a particular packet for recovery purposes in case the packet is lost in the network or received erroneously at the destination. The information fields in a read request packet consists of the operation code (OPCODE) field 134, the flags field 138, and the memory address field 142. A store-request packet additionally contains the data field 146. The operation code field 134 specifies the type of requests, that is a read or a store operation; other operation-types may be defined to suit the special needs of the system. The flags field 138, which is optional, contains one or more flags to specify various options or parameters associated with the request. These flags are of no relevance to the present invention.

The memory address field 142 in a read-request packet specifies the address in the memory module where the requested data resides. The memory address consists of both the address of the memory module as well as the location of the accessed data in the memory module. In the case of a store-request packet, data field 146 contains the data to be stored in the location specified by the address field 142.

On receiving a request packet from a processing element, the memory module performs the read or store operation specified in the packet and transmits the result back to the processing element. This result is transmitted in the form of a response packet over the response network. In the case of a read request, the response consists of the data read from the specified memory location. In the case of a store request, the response contains the status of the write; that is, whether the data was stored successfully. The composition of the two types of response packets is illustrated in FIG. 3. As in the case of the request packets, a response packet consists of a header part followed by information. The header part consists of fields 150, 154 and 158. The destination-address field 150 specifies the address of the processing element where the packet is destined. The destination address is used by the response network to route the packet to the correct processing element. The source-address field 154 specifies the address of the memory module which generated the request. The packet identification (PID) field 158 is similar in function to the PID field 130 described previously.

The information fields in a store-response packet consists of the result code 162, the flags field 166, and the memory address field 174. A read-response packet additionally contains the data field 176. The result code communicates the outcome of the operation; that is, whether the read or store operation was successful. It may additionally indicate special conditions such as an access-violation. The flags field 166 contains one or more status flags. In particular, it consists of a memory-module status flag 170 which is vital to the operation of the invention. Other flags are optional and not relevant to the invention. The memory address field 174 is identical to the memory-address field 142 of a request packet. In the case of a read-response packet, the data field 178 contains the data read from the location specified by the address field 174.

Having described the overall system where the invention is employed, the preferred embodiment of the invention is now described in detail. The invention consists of three distinct elements: (1) means within each memory module for monitoring of traffic into it and determining its status as "hot" or "cool", (2) a feedback mechanism for notifying each processing element about the status of each memory element, and (3) means within each processing element to select a routing method dynamically based on the knowledge of the status of the memory modules. These three parts are described in detail in the following.

Detection of Traffic Non-Uniformities

The detection method is based on the principle that traffic non-uniformities which cause congestion in the interconnection network result in a higher traffic-rate into one or more memory modules. Therefore, such non-uniformities can be detected by counting the number of requests arriving at a memory module. The number of requests arriving at a memory module over a period of time, referred to as a window-length, W, is counted and checked to see if this number exceeds a certain threshold. Thus, the detection mechanism marks a memory module as a "hot" if it has received at least H requests during the last W cycles, where H is less than or equal to W. The status is reset to "cool" when the number of requests serviced in the last W cycles drops below a second threshold, NH.

The window-length, W, as well as the thresholds, H and NH, are parameters determined empirically by the system-designer. The effectiveness of the overall strategy in maximizing the performance of the system for all traffic conditions depends on the effectiveness of the detection mechanism in responding to the right traffic intensity to change its status before the change in traffic has caused any appreciable degradation in performance. This effectiveness depends to a great degree on the choice of the window-length, W, and the thresholds, H and NH. These parameters should be set taking into consideration the specific design parameters of the of the system and, in particular, the interconnection network. The following are some of the guidelines in selecting the parameters W, H and NH.

If the window-length, W, is set too small, false indications of hot memory-modules may result. This is because, even with uniform traffic, a memory-module may receive short bursts of requests. Thus, if the period of observation is too short, such bursts may cause the status to change from cool to hot. Subsequently, a short period of inactivity will switch the status back to cool. Thus, the status may oscillate rapidly back and forth between hot and cool, rendering the invention ineffective. An excessively large W, on the other hand, provides a reliable indication of traffic non-uniformities, but there is the risk that tree-saturation might already have occurred before a hot memory module is detected.

The choice of W is also influenced by the traffic intensity, that is the rate at which the processing elements generate their requests. With low intensity of traffic, a comparatively short window-size is sufficient to detect the concentration of traffic to a memory module reliably. However, when the traffic intensity is high, the rate of traffic into a memory module can be high over short intervals even when the traffic is highly uniform. In general, a higher traffic intensity mandates a larger window-size.

The threshold H should be set sufficiently high as to detect only traffic non-uniformities that cause severe congestion in the network. The threshold NH should be set to be lower than H to prevent oscillations, but should be higher than the request-rate experienced under uniform traffic.

Figure 4:
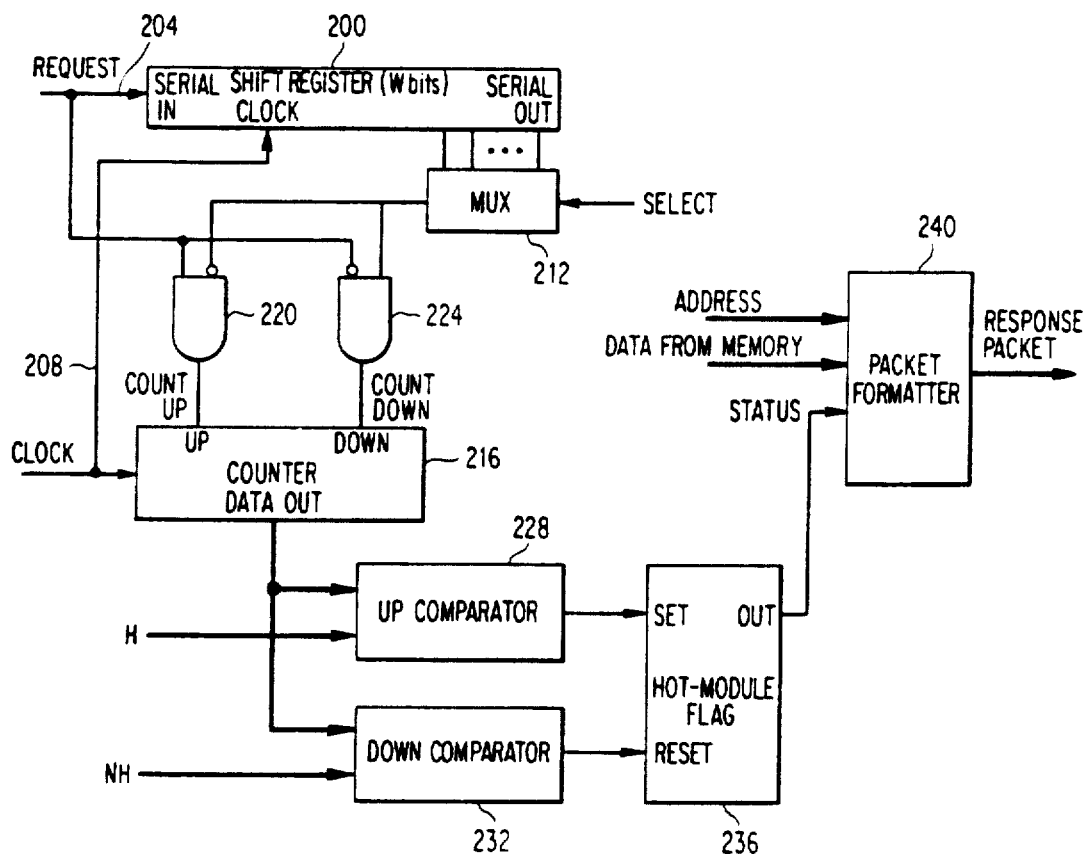
FIG. 4 is a functional block diagram of the detection mechanism employed within each memory module.

FIG. 4 shows the block diagram of the detection circuit in each memory module. The circuitry keeps track of the number of requests received during a sliding window covering the last W cycles by means of a shift register 200. A logic "1" is entered into the shift register 200 through its serial input 204 during every cycle in which a request is received by the memory module. A logic "0" is entered during every cycle in which no request is received. These values are shifted into the shift register 200 by a clock 208 which is pulsed once every request-cycle. Thus, the number of "1s" in the shift register 200 at any instant represents the number of requests received by the memory module during the previous number of cycles equal to the number of stages in the shift register. An nx1 multiplexer 212 is connected to receive n outputs from the shift register 200 and select one of those inputs as the output of the multiplexer. The output selected corresponds to the window-length, W, and is selected by multiplexer 212 in response to a select signal set by the operating system. Thus, W may be programmable.

To avoid decoding the contents of the shift register which can be hundreds of bits long, a separate up/down counter 216 is used to keep track of the number of "1s" in the shift register. The counter 216, which has a maximum count of the largest W, is made to keep track of the number of "1s" in the shift register from its input to the selected output by monitoring the serial input to the shift register 200 and the serial output of the multiplexer 212. Specifically, the following actions are taken to make the count of counter 216 correspond to the number of "1s" in the shift register 200.

If the bit shifted into the register 200 is the same as the bit shifted out via the multiplexer 212, the count is left unchanged. If the bit shifted in is a "1" and the bit shifted out via the multiplexer 212 is a "0", the counter 216 is incremented by one. If the bit shifted in is a "0" and the bit shifted out is a "1", the counter 216 is decremented by one. The AND gates 220 and 224 implement this logic. The AND gate 220 activates the count-up control input of the counter 216 when the input of the shift register 200 is a "1" and the output of the multiplexer 212 is a "0", causing it to be incremented by one. Similarly, the AND gate 224 actives the count-down input of the counter when the output of the multiplexer 212 is a "1" while the input to the shift register 200 is a "0". This causes the counter to decrement by one.

The parallel output of the counter 216 is connected to two comparators 228 and 232. The first comparator 228 compares this count with the preset threshold H. If the count matches H at any time, the output of the comparator 228 is activated. This output is used to set the hot-module flag 236. The hot-module flag is a flip-flop which, when set, marks the memory module as hot. The second comparator 232 compares the output of the counter 216 against the second threshold NH. The comparator 232 activates its output when the count goes below the preset threshold NH. This, in turn, resets the hot-module flag 236, reverting the status of the memory module to cool.

The thresholds H and NH given as inputs to the comparators 228 and 232, respectively, are set by the operating system software of the multiprocessor system. The parameter W may be fixed in the embodiment of FIG. 4 by eliminating the multiplexer 212 and connecting the output of the shift register 200 directly to AND gates 220 and 224.

Notification of Memory-Module Status to Processing Elements

Once the status of a memory module changes from cool to hot or vice-versa, the change needs to be communicated to the processing elements to enable them to modify their routing method. This can be achieved by a separate feedback network dedicated to this function. However, such a network is expensive in large multiprocessor systems. The invention therefore uses the response network 110 itself for communicating the status of the memory module to the processing elements.

The invention associates a module-status flag with every response packet transmitted by a memory module. This flag 170 was described earlier in the context of describing the composition of a response packet. The flag reflects the current contents of the hot-module flag 236. The value of this flag is inserted into the packet every time the packet formatter 240 assembles a response packet for transmission to a processing element. Thus, any processing element originating a request to a memory module is notified of its status when it receives the response to its request. In this way, the change in status of a memory module is detected individually by every processing element that received a response packet from the memory module after the change occurred.

Routing of Requests

The basic objective of the invention is to improve the performance of processor-to-memory communication under various traffic conditions. This is achieved by selecting a routing method for distributing the requests among the two networks to suit the traffic condition. The invention provides two distinct methods of routing requests from a processing element to memory modules. The first method is employed when no hot memory-modules are present. Detection of one or more hot modules causes the processing element to resort to the second method until such time when all the modules revert to cool status. Each processing element makes this decision independently based on its knowledge of the statuses of the memory-modules at that time. This knowledge, in turn, is obtained from the hot-module flag received as part of each response message. The implementation of these two routing methods in a processing element as well as means for selecting between them dynamically based on detected statuses of the memory modules are described below.

The first method for routing request packets among the two networks attempts to distribute the packets evenly among the networks. This is achieved by routing the outgoing packets from a processing element alternately to the two networks. This method will be referred to as balanced routing since it attempts to balance the total load among the two networks. Such alternate routing of packets is easy to implement in hardware; however, means must be provided to prevent two requests issued from a processing element to the same memory address reaching the memory module in reverse order, because they were routed on different networks. Such leapfrogging can cause inconsistencies in program execution. The present invention provides hardware-mechanisms to prevent such leapfrogging of requests.

The balanced routing method provides the best performance when the traffic is uniform; that is, the accesses from processing elements are almost evenly distributed among the M memory modules. However, with non-uniform traffic, that is with a disproportionately large amount of traffic directed to one or a few memory modules, both networks soon become congested, increasing the delay substantially for all the requests. The invention uses a second method of routing, referred to as fixed routing in the presence of such non-uniform traffic. With fixed routing, all traffic to hot memory modules are routed exclusively on network A and all the remaining traffic is routed through network B. By confining all traffic to hot modules in network A, the method provides a clear path for all the remaining traffic through network B. Note that the method does not eliminate network-congestion, but rather limits it to network A. The throughput to a hot memory module is ultimately limited by its service-rate; hence, this throughput cannot be improved without the additional expense of a combining network. The present invention frees all traffic to cool memory modules from the paralyzing effect of tree-saturation, while allowing the traffic to hot memory modules to proceed at the maximum rate it can be serviced by the memory modules.

Figure 5:
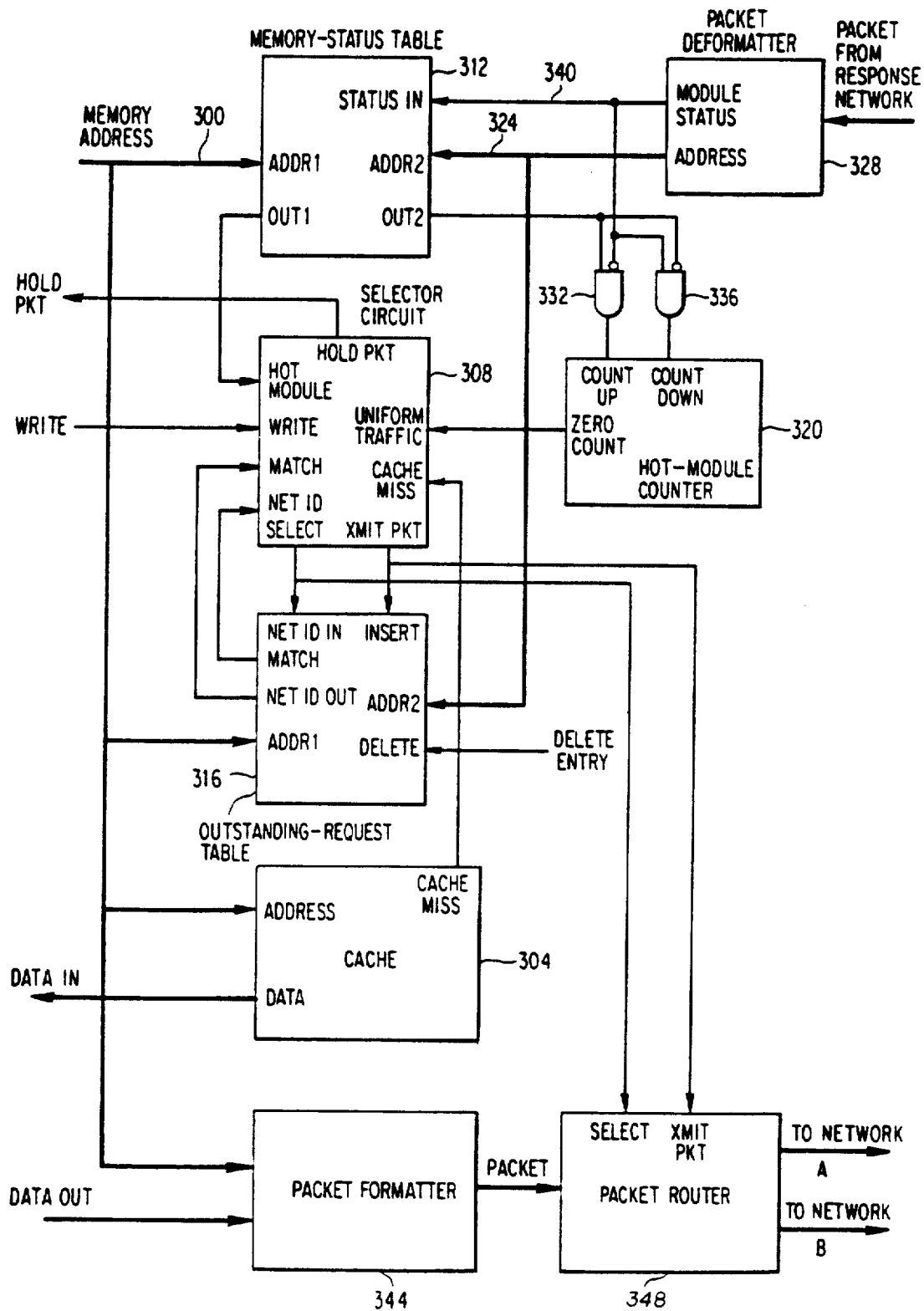
FIG. 5 is a block diagram of routing control at each processor showing the functional elements involved in the routing of requests to the networks.

FIG. 5 shows the block diagram of the hardware for implementing the routing methods in a processing element. A request for memory-access begins by placing the memory address on the memory-address bus 300. The memory address is assumed to consist of two parts. The first part identifies the requested memory module, and the second part determines the location of a particular word or addressable element within the memory module. The memory address placed on the memory-address bus 300 is the physical address. If virtual addresses are used in the multiprocessor system where the present invention is employed, suitable means for translating the virtual addresses into physical addresses must be provided before the memory-address bus 300.

A cache memory 304 is useful in reducing the traffic to the networks by providing fast access to recently-accessed data. The use of such a cache is optional to the invention, and the routing logic can easily be modified for the case when no cache is present. When a cache is present, care should be taken to ensure coherence in the memory hierarchy. For this reason, some data may be designated as noncacheable, and such data are not stored in the cache. In this embodiment, a "store-through" policy is assumed where all write operations bypass the cache. Alternate policies like "store-in" can be implemented with minor changes to the embodiment. With these assumptions, a memory access is routed to the interconnection network under the following two conditions: (1) The memory-access operation is a write operation, and (2) the memory-access operation is a read-operation but results in a cache-miss.

These conditions are used by the selector circuit 308 as the criteria to determine if a network-request needs to be generated corresponding to a memory-access. If a request needs to be generated, the selector circuit 308 further determines the network on which the request is to be routed. The detailed logic involved in this selection process is described later. The selector circuit 308 performs this decision with the aid of a memory-status table 312, an outstanding-request table 316, and a hot-module counter 320. These elements are described in detail now. The memory-status table 312 stores the status of each memory module as hot or cool. It is organized as a random-access memory with M entries, addressed by the memory-module number. Each entry is one bit long. A "1" indicates the corresponding memory-module as hot and a "0", as cool. The memory-status table can be accessed from two ports. The first port is a read-port while the second port supports both read and write. The first port consists of the address lines labelled ADDR1 and the data output line OUT1. These address lines are connected to the lines indicating the memory-module number among the lines of the memory-address bus 300. Thus, during a memory-access, the status of the corresponding memory-module appears at the OUT1 output. This line is given as one of the inputs to the selector circuit 308 and is labelled HOT MODULE because it attains a value of "1" when the accessed memory module has been marked as a hot module.

The second port of the memory-status table 312 consists of address lines ADDR2, a data input line STATUS IN, and a data output line OUT2 as well as the necessary control signals. This port is used to modify the contents of the table based on the status information received as part of each response packet. The address lines are connected to an address bus 324. An entry in the table can be updated by placing the module address on the address bus 324, the new data ("0" or "1") on the STATUS IN input, and activating the proper control lines. Additionally, the entry in the table 312 addressed by the address bus 324 can be read out on the OUT2 output.

The address bus 324 originates at the packet deformatter 328 whose function is to extract the individual fields from each response packet received from memory modules over the response network. When a response packet is received, the packet deformatter 328 extracts the memory address field 174 and places this information on the address bus 324. The packet deformatter 328 also places the value of the module-status flag from its field 170 of the response packet on the module-status line 340. These address and flag values are used to update the memory-status table 312, the outstanding-request table 316, and the hot-module counter 320 as described later.

While the memory-status table 312 stores the status of each memory-module as hot or cool, the hot-module counter 320 is used to keep a count of the number of hot-modules in the system. Thus, the value of the hot-module counter 320 at any time is equal to the number of "1" -entries in the memory-status table 312. The hot-module counter 320 is implemented as an up-down counter. The counter 320 is incremented by one when a change from hot to cool status is detected of a memory module. Similarly, it is decremented by one when a change in status from hot to cool is detected. The AND gates 332 and 336 control the up- and down-counting, respectively, based on information put out by the packet deformatter 328. The only information needed out of the hot-module counter 320 is whether its count is zero or non-zero. A count of zero indicates that no hot memory modules have been detected, which implies that the traffic is perceived to be uniform. A nonzero count indicates the presence of one or more hot modules. This information is presented by the counter on the output line labelled ZERO COUNT and is used by the selector circuit 308 in making routing decisions.

The outstanding-request table 316 is used to maintain a record of all outstanding network-requests from the processing element. An outstanding request is a request that has been transmitted by the processing element over one of the networks A and B, but whose response has not yet been received by the processing element. If a request is sent while a previous request to the same memory module is outstanding, and if the two requests are routed over different networks, leapfrogging of memory accesses may result. The function of the outstanding-request table is to prevent this condition. The outstanding-request table 316 is organized as an associative memory with sufficient number of locations as to store the maximum number of outstanding requests allowed in the design. The format of the table is illustrated in FIG. 6. Each entry consists of a memory address field and a network identification field. The memory-address field stores the physical memory address, comprising both the address of the memory module and the location within the module, of an outstanding request. The network identification field stores the network identification on which the corresponding request was routed. This field consists of a single bit, with a value of "0" indicating network A and "1" indicating network B.

The outstanding-request table 316 can be accessed from two ports. The first port consists of address lines marked ADDR1, a MATCH output line, and a NET ID OUT output line. The MATCH line is activated if the address field of an entry in the table matches with the address presented on the ADDR1 lines. Further, if such a match is found, circuitry within the outstanding-request table 316 sets the NET ID OUT line to the value of the network identification field of the matching entry. Thus, during a memory access, the MATCH output of the table indicates if any requests are outstanding to the requested memory address, and the NET ID OUT output indicates the network used for the matching request, if a match exists. During each memory access, the memory address on the memory-address bus 300 is compared against the addresses of all outstanding requests stored in the outstanding-request table 316. In case of a match, as indicated by the MATCH output, the selector circuit 308 further compares the network identification selected for the current request against the network identification presented on the NET ID OUT line. If the two network identifications are identical, the request is allowed to proceed. If, on the other hand, the two network identifications are different, the current request is held or frozen in its state until the response to the matching request in the outstanding-request table 316 is received.

When a request is allowed to proceed to the network, an entry corresponding to that request is inserted into the outstanding-request table 316. Such insertion is controlled by the INSERT input to the table. When this line is activated, a new entry is inserted into the table such that its address field has the value of the current memory-address on the ADDR1 lines and its network identification field has the value present on the NET ID IN input line. The INSERT input is tied to the XMIT PKT output of the selector circuit 308. The selector circuit 308 activates this line when a decision is made to route the request over one of the networks. Further, when such a decision is taken, the selector circuit 308 also sets its SELECT output line to the identification of the network chosen to route the current request. Because this SELECT output is tied to the NET ID IN input of the outstanding-request table, it sets the network identification field of the new entry in the outstanding-request table 316 to correspond to the network identification determined by the selector circuit 308.

The second port of the outstanding-request table 316 is used to remove entries from the table once the responses corresponding to them are received. The second port consists of address lines marked ADDR2 and a DELETE control input. Activation of the DELETE control input causes the entry whose address field matches with the address presented on the ADDR2 lines to be deleted from the table. This deletion operation is initiated by the packet deformatter 328 on receipt of a response packet.

The packet deformatter 328 is responsible for maintaining the memory-status table 312 as well as the hot-module counter 320 updated to the latest available status. When a response packet is received by the processing element, the packet deformatter 328 extracts the address of the memory-module which generated the response packet, as well as the module-status bit corresponding to that module, from the packet. The deformatter 328 then places the memory address thus extracted on the address bus 324 and the module-status bit on the MODULE STATUS output. The latter is connected to the STATUS IN input of the memory-status table 312. The memory-status table 312 then uses the part of the address on bus 324 representing the memory-module number to find the status currently stored at that location. The AND gates 332 and 336 now compare this old status with the new status output from the packet deformatter 328 to see if the hot-module counter 320 needs to be updated. If the old status and new status are identical, no change in the count is effected; however, if the statuses differ, one of the AND-gate outputs is activated. If the old status is a "0" while the new status is a "1", the AND gate 332 causes the counter 320 to count up by one. The reverse condition enables the AND gate 336 causing the counter 320 to count down by one. The former condition represents the change of status of a memory-module from cool to hot, and the latter condition represents the opposite. The AND gates 332 and 336 therefore update the counter 320 to reflect the change.

After the old status is read out from the memory-status table 312 and the hot-module counter 320 is updated, the new status output on the MODULE STATUS line is written into the memory-status table 312 to replace the old status. Thus, updating the memory-status table 312 and the hot-module counter 320 consists of a read operation to read the old status followed by a write operation to write the new status.

While the memory-address table 312 is being updated as described above, the packet deformatter 328 also updates the outstanding-request table 316 by removing the entry corresponding to the received response packet. This is achieved by activating the DELETE input of the outstanding-request table. The memory-address put out by the deformatter 328 on the address bus 324 is used by the outstanding-request table 316 to determine the entry to be deleted. Note that the outstanding-request table 316 uses the entire memory-address present on the address bus 324, including both the memory-module number and the location within the memory module, to perform the deletion. The memory-status table 312, on the other hand, uses only the memory-module number. Note also that more than one entry in the outstanding-request table 316 may match with the address presented, because the invention does not preclude the possibility of multiple outstanding requests to the same memory-address as long as all of them are routed on the same network. The logic in the outstanding-request table 316 should be designed such that only one matching entry is deleted during each deletion operation. Because of the associative nature of the table, however, any of the matching entries may be chosen arbitrarily for deletion.

The packet formatter 344 is responsible for constructing a request packet by assembling information associated with a memory access. Such information includes the memory address placed on the memory address bus 300 during the access and the data to be written to memory in the case of a write access. The request packet constructed by the packet formatter 344 is then presented to the packet router 348, which transmits the packet to one of the networks. Two control inputs, SELECT and XMIT PKT control the transmission of the packet and are provided by the selector circuit 308. The SELECT signal specifies the network for routing while the XMIT PKT enable the packet to be transmitted to the selected network. The packet router 348 has two sets of data output lines, one connected to network A and the other to network B. The SELECT signal determines which of these will be used for transmission of the current packet.

The selector circuit 308 is responsible for making the routing decisions associated with a memory request. It determines (1) if a given request needs to be routed to one of the networks, (2) which of networks A and B is to be used for routing, and (3) if the request needs to be "held" because of the possibility of leapfrogging described earlier. The selector circuit 308 utilizes the following inputs for performing its function. The CACHE MISS input is activated by the cache if the current memory-access results in a cache-miss. The WRITE input distinguishes the current memory access as a read or a write ("0"=read, "1"=write). The MATCH and NET ID signals are input from the outstanding-request table 316. As described earlier, the MATCH line is activated when the memory address corresponding to the current access matches with an entry in the outstanding-request table. If such a match exists, the NET ID line indicates the network used for routing the request corresponding to the matching entry. The HOT MODULE signal is input from the memory-status table 312. This signal is active if the memory-module referenced by the current access is designated as a hot module in the memory-status table 312, and inactive otherwise. The input labelled UNIFORM TRAFFIC is driven by the hot-module counter 320 depending on its count of the number of hot-modules present. A "1" on this input indicates a counter value of zero, and represents uniform traffic. A "0" indicates the presence of one or more hot memory-module and therefore nonuniform traffic.

The selector circuit 308 has three outputs. The XMIT PKT line is activated when the decision logic in the selector circuit determines that the current request needs to be routed to one of the networks. It enables transmission of a the request packet corresponding to the current access into one of the networks. The SELECT output line further specifies the network to which the current request is to be routed, a value of "0" indicating network A and "1" indicating network B. The HOLD PKT output line is activated to hold a memory reference until an outstanding request to the same memory address is satisfied. This output is sent to the processor requesting the memory access.

FIG. 7 shows the decision logic within the selection circuit 308 used to make these decisions. The OR gate 400 produces an active output when either the current access is a write or the accessed data is not found in the cache. Thus, an active output of the OR gate 400 indicates that the current request needs to be routed to one of the networks. This output goes through further stages of logic consisting of gates 412 and 420 to check for the conditions under which leapfrogging may result. No such leapfrogging is possible if the MATCH input is inactive. In this case, The AND gate 412 allows the output of the OR gate 400 to proceed to the XMIT PKT output. If the MATCH input is active, however, the exclusive-OR gate 404 compares the network identification selected for the current request with that used by the matching request. In the event of a disagreement, the AND gate 420 is enabled, thereby activating the HOLD PKT signal. If the two network identifications are identical, however, the AND gate 408 allows the output of the OR gate 400 to proceed to the XMIT PKT output, thereby enabling transmission of the request to the network.

The gates 424, 428 and 432, together with the flip-flop 436, perform the function of selecting one of the networks for routing the current request. They select one of the routing methods, balanced routing or fixed routing, depending on whether any hot modules have been detected at the present time. The flip-flop 436 implements the balanced routing. It is toggled every time the XMIT PKT line is activated to enable the transmission of a packet and therefore produces alternate "1s" and "0s" for each request. The output of the flip-flop 436 is directly routed to the SELECT output when the UNIFORM TRAFFIC line is active, indicating uniform traffic. When one or more hot modules have been detected, however, the AND gate 428 disables the flip-flop output. In such a case, the fixed routing method dictates that selection of the network be performed based on whether the current request is directed at a hot module or not. The AND gate 424 implements this selection under fixed routing. Its output is a "0" when the accessed module is a hot module, specifying network A to be used, and "1" otherwise, specifying network B.

Having thus described the individual functional elements of FIG. 5, the operations associated with a memory access are now summarized. The memory access operation is illustrated in the flow diagram of FIG. 8. A memory access can be a read operation or a write operation. A memory access begins by placing the memory address on the address bus 300 and activating the proper control lines to signal the memory access. The WRITE line is used to distinguish between a read access and a write access. During a memory access, the following operations proceed in parallel.

A test is made in decision block 502 to determine if the memory request is a write request. If the access is a read, a cache-access is performed to check if the referenced data is available in the cache. A test is made in decision block 504 to determine if the data is available. If available, the data is immediately forwarded to the data bus, as indicated by function block 506. If the data is not available, the CACHE MISS line is activated by cache 304.

In the event of a cache miss, or if the memory access is a write operation, a request needs to be routed to the corresponding memory module over one of the networks 108 or 112. The memory-module address corresponding to the access is used to address the memory-status table 312 and the outstanding-request table 316 in function block 508. The selector circuit 308 is, at the same time, activated in function block 510 to determine the network for routing the request. The status of the module, "hot" or "cool", appears on the OUT1 line of the memory-status table 312. In function block 512, the outstanding-request table 316 checks for any pending requests to the same memory address. A match causes the MATCH output to be activated and the NET ID OUT output to show the network id for the matching entry. The results of these two lookup operations are used by the selector circuit 308 to determine the network on which the request is to be routed.

Once the selector circuit determines the network for routing the request, the memory address and the data (in case of a write) are used by the packet formatter 344 to construct a request-packet, combining the various fields indicated in FIG. 3 corresponding to the memory access, as indicated in function block 514. This packet is presented to the packet router 328 which routes the packet to the network selected by the selector circuit 308, as indicated in function block 516.

The above operations are allowed to proceed concurrently to reduce the memory-access latency. If the memory reference is satisfied by the cache, no further processing is necessary. Otherwise, the selector circuit 308 uses the information presented to it by the various functional elements to determine how the packet is to be routed to the network. If the selector circuit 308 determines that the request is to be held pending the receipt of the response to an outstanding request, it activates the HOLD PKT line to the processor requesting access, thereby freezing the memory access. Otherwise, the selector circuit 308 activates the SELECT and XMIT PKT lines as described earlier to route the request packet to the network.

FIG. 9 is a flow chart illustrating the actions performed when a packet is received from the response network 110 in response to an outstanding request. The memory address field of the response packet is used to address the memory-status table 312 to obtain the previous status of the corresponding memory flag 170 of the response packet in function block 522. The status read out of memory-status table 312 is compared in function block 524 with the new status as indicated by the flag in the received packet. A test is then made in decision block 526 to determine if the status has changed. A mismatch indicates change of the status from "hot" to "cool" or vice versa. If the status has changed, the memory-status table 312 is then updated with the new status in function block 528. In addition, the hot module counter 320 is also updated in function block 530, incrementing it if the transition is from "cool" to "hot" and decrementing it otherwise. Finally, the entry corresponding to the received response is removed from the outstanding-request table 316 in function block 532 to mark the completion of the request. If the response packet indicates a read response, the associated data is then forwarded to the processor making the request in function block 534.

The above operations may be controlled by control circuitry consisting of a sequencer. Procedures for design of such circuitry from a description of the sequence of operations are wellknown and require no further explanation to those skilled in the art. Alternatively, the operations may be implemented in software, and a programmer skilled in the art can readily write source code from the flow diagrams of FIGS. 8 and 9.

While the invention has been described in terms of a single preferred embodiment, those skilled in the art will recognize that the invention can be practiced with modification within the spirit and scope of the appended claims. For example, the preferred embodiment uses two switching networks, but it will be apparent to those skilled in the art that more than two networks could be used to implement a more complex dynamic routing algorithm.

Having thus described our invention, what we claim as new and desire to secure by Letters Patent is as follows:

1. Apparatus for mounting processor-memory traffic in a shared-memory multiprocessor computer system of the type comprising a plurality of processing elements and a plurality of memory modules, comprising:

an interconnection system having at least two multistage switching networks, said at least two multistage switching networks each interconnecting said plurality of processing elements and said plurality of memory modules;

means for detecting traffic non-uniformities in each memory module, said detecting means counting a number of requests to a memory module during a predetermined number of cycles and comparing a count to first and second predetermined thresholds; and feedback means to notifying said plurality of processing elements as to a status of each memory module; and means within each processing element responsive to said feedback means for selecting one of said at least two networks for routing a request based on two different routing methods, a first of said routing methods suited to uniform traffic conditions and a second of said routing methods suited to non-uniform traffic conditions, said means for selecting comprising:

a memory-status table addressed by a memory address from one of said processing elements, said memory-status table providing a first output indicating a status of an addressed memory module;

a selector circuit responsive to said first output of said memory-status table and generating a select output;

packet router means responsive to said select output for routing a memory request from said one of said processing elements to one of said switching networks; and counter means responsive to said feedback means for maintaining a count of memory modules having a non-uniform traffic status.

2. The apparatus for routing processor-memory traffic in a shared-memory multiprocessor computer system recited in claim 1 wherein said means for selecting further includes means for preventing memory requests from a corresponding one of said processing elements from getting out of order due to said requests being routed through different ones of said at least two switching networks.

3. The apparatus for routing processor-memory traffic in a shared-memory multiprocessor system recited in claim 2 wherein said means for preventing memory requests from getting out of order comprises:

an outstanding-request table addressed by said memory address from said one of said processing elements, said outstanding-request table providing a first output indicating whether an addressed memory module has been previously addressed but no response has been received from said addressed memory module and a second output identifying the switching network which a previous request was routed; and comparing means in said selector circuit enables by said first output of said outstanding-request table for comparing said second output with said select output to determine if there is a match and, if so, generating a hold packet output to said processing element.

4. The apparatus for routing processor-memory traffic in a shared-memory multiprocessor computer system recited in claim 1 wherein said means for detection of traffic non-uniformities includes detecting means in each of said memory modules for designating the memory modules as hot or cool based on monitoring traffic to the module.

5. The apparatus for routing processor-memory traffic in a shared-memory multiprocessor computer system as recited in claim 4 wherein said detecting means comprises:

windowing means for counting the number of requests to a memory module during a predetermined number of cycles;

comparing means connected to said windowing means for comparing a count in said windowing means to first and second predetermined thresholds; and flag means set by said count exceeding said first threshold and reset by said count going below said second threshold.

6. The apparatus for routing processor-memory traffic in a shared-memory multiprocessor computer system as recited in claim 5 wherein said first and second predetermined thresholds are set by an operating system of said multiprocessor computer system.

7. The apparatus for routing processor-memory traffic in a shared-memory multiprocessor computer system as recited in claim 5 further comprising programmable means in said windowing means for charging the number of cycles during which memory requests are counted.

8. The apparatus for routing processor-memory traffic in a shared-memory multiprocessor computer system as recited in claim 5 wherein said interconnection system includes a response network for routing response data from said memory modules to said processing elements and said feedback means includes packet formatter means at each of said modules connected to said response network and receiving said response data and responsive to said flag means for setting a flag indicating traffic non-uniformities at the module.

9. The apparatus for routing processor-memory traffic in a shared-memory multiprocessor system recited in claim 8 wherein said means for selecting comprises:

a memory-status table addressed by a memory address from said one of said processing elements, said memory-status table providing a first output indicating a status of an addressed memory module;

a selector circuit responsive to said first output of said memory-status table and generating a select output; and packet router means responsive to said select output for routing a memory request from said one of said processing elements to one of said switching networks.

10. The apparatus for routing processor-memory traffic in a shared-memory multiprocessor computer system recited in claim 9 wherein said means for selecting further includes means for preventing memory requests from a corresponding one of said processing elements from getting out of order due to said requests being routed through different ones of said at least two switching networks.

11. The apparatus for routing processor-memory traffic in a shared-memory multiprocessor computer system recited in claim 10 wherein said means for preventing memory requests from getting out of order comprises:

an outstanding-request table addressed by said memory address from said one of said processing elements, said outstanding-request table providing a first output indicating whether an addressed memory module has been previously addressed but no response has been received from said addressed memory module and a second output identifying the switching network over which the previous request was routed; and comparing means in said selector circuit enabled by said first output of said outstanding-request table for comparing said second output with select output to determine if there is a match and, if so, generating a hold packet output to said processing element.

12. The apparatus for routing processor-memory traffic in a shared memory multiprocessor computer system recited in claim 11 wherein said means within each processing element further comprises a packet deformatter providing as a first output an address of a responding memory module and as a second output the status of the responding memory module and wherein said means for selecting further comprises counter means responsive to said second output of said deformatter for maintaining a count of memory modules having a non-uniform traffic status, said first and second outputs being supplied to said memory-status table for updating the memory-status table and said first output being supplied to said outstanding-request table for updating the outstanding-request table.

* * * * *